(12) United States Patent
Sacco (10) Patent No.: US 8,511,842 B1
(45) Date of Patent: Aug. 20, 2013

(54) EDDY CURRENT BASED MIRROR WAVEFRONT CONTROL

(75) Inventor: Andrew P. Sacco, Pittsford, NY (US)

(73) Assignee: Exelis, Inc., McLean, VA (US)

( * ) Notice: Subject to any disclaimer, the term of this patent is extended or adjusted under 35 U.S.C. 154(b) by 686 days.

(21) Appl. No.: 12/724,048

(22) Filed: Mar. 15, 2010

(51) Int. Cl.
*G02B 5/08* (2006.01)
(52) U.S. Cl.
USPC .......................................... 359/846
(58) Field of Classification Search
USPC ................... 359/846, 849, 223.1–226.1, 290, 359/291
See application file for complete search history.

(56) References Cited

U.S. PATENT DOCUMENTS

| 7,200,298 B2 * | 4/2007 | Kimura ......................... 359/291 |
| 2008/0259439 A1 * | 10/2008 | Shiraishi ....................... 359/360 |

* cited by examiner

*Primary Examiner* — Euncha Cherry
(74) *Attorney, Agent, or Firm* — RatnerPrestia (57) ABSTRACT

The present invention relates to a system for modifying wavefronts of electromagnetic waves. The system includes a flexible mirror having an obverse surface and a reverse surface. The obverse surface has a contour configured to reflect the electromagnetic waves. The system also includes a plurality of actuators positioned along the reverse surface of the mirror for applying at least one transverse magnetic force to the flexible mirror to modify the contour of the obverse surface. Modifying the contour of the obverse surface of the mirror modifies the wavefronts of the electromagnetic waves.

16 Claims, 10 Drawing Sheets

EDDY CURRENT BASED MIRROR WAVEFRONT CONTROL

FIELD OF INVENTION

The present invention relates, in general, to optical wavefront correction via flexible mirror. The flexible mirror may be included in a telescopic system located in a terrestrial environment or outer space. The flexible mirror includes a lightweight (low mass/low density) aerogel core sandwiched between an obverse layer and a reverse layer (e.g. sapphire substrate material) on each respective side. A surface of the obverse layer is polished and coated to specific optical qualities (optical layer) for reflecting electromagnetic waves (e.g. light, laser), while the reverse layer provides stress relief to the mirror. In general, the flexible mirror is mounted over a honeycomb support structure which houses eddy current actuators. The eddy current actuators are modulated to magnetically push on the reverse surface of the flexible mirror thereby providing wavefront modification on the scale of a fraction of a wavelength.

BACKGROUND OF THE INVENTION

In conventional systems, large aperture mirrors tend to have significant mass and therefore are susceptible to unwanted deformation due to gravitational and inertial forces. A number of actuators which may be physically attached to the reverse surface of the mirror (for flexing the mirror) also add to the mass and provide both thermal and mechanical stress points. In a terrestrial environment, such as on Earth, gravitational forces as well as any attachment points act on the mirror from various angles. This gravitational force deforms the mirror thereby producing wavefront errors in the received light waves. In a space environment, such as on a satellite orbiting the Earth, inertial forces (due to acceleration of the satellite) and forces due to lack of gravity (gravitational unload after test and alignment under gravitational load) also act on the mirror from various angles thereby deforming the mirror and producing wavefront errors. In general, the gravitational and inertial forces are proportional to the mass of the mirror.

SUMMARY OF THE INVENTION

To meet this and other needs, and in view of its purposes, the present invention provides a system for modifying wavefronts of electromagnetic waves. The system includes a flexible mirror having an obverse surface and a reverse surface, where the obverse surface has a contour configured to reflect electromagnetic waves. The system also includes a plurality of actuators positioned along the reverse surface for applying at least one transverse magnetic force to the flexible mirror to modify the contour of the obverse surface. In general, modifying the contour of the obverse surface modifies wavefronts of the electromagnetic waves.

The flexible mirror includes obverse and reverse layers, and a low density core sandwiched between the obverse and reverse layers. The obverse layer includes the obverse surface, and the reverse layer includes the reverse surface. In one embodiment, the obverse and reverse layers are each comprised of sapphire, and the low density core is comprised of aerogel.

The system also includes a mirror base positioned along the reverse surface, where the mirror base includes a plurality of structures for housing the plurality of actuators. In one embodiment, the mirror base is comprised of silicon carbide.

The plurality of actuators in the system include at least one eddy current actuator having a field coil and a disk armature. The disk armature of the eddy current actuator is attached to the reverse surface of the flexible mirror, and a gap is formed between the disk armature and the field coil. In general, the transverse force is a magnetic force applied through the gap between the disk armature and the field coil.

The plurality of actuators may also include at least one linear voice coil motor having an armature attached to the reverse surface of the mirror, where the transverse force is applied by the armature to the reverse surface of the mirror. The system may also include a filter having an array of openings for receiving the electromagnetic waves reflected from the flexible mirror and forming a pattern. In general, a sensor detects the pattern and a processor receives the pattern from the sensor to determine wavefront errors in the electromagnetic waves. The processor provides a signal to at least one actuator to provide the at least one transverse force to the flexible mirror to modify the electromagnetic wavefront.

The system may be a telescopic system that includes a primary flexible mirror having an obverse surface and a reverse surface, where the obverse surface has a contour configured to reflect electromagnetic waves received by the telescopic system. The system may also include a secondary mirror configured to receive the electromagnetic waves reflected from the primary mirror, and a plurality of actuators positioned along the reverse surface for applying a transverse magnetic force to the flexible mirror to modify the contour of the obverse surface. In general, modifying the contour of the obverse surface modifies the wavefront of the electromagnetic waves received by the telescopic system.

In one embodiment, the plurality of actuators includes at least one eddy current actuator having an field coil and a disk armature, where the disk armature is attached to the reverse surface of the flexible mirror and the field coil is positioned at a distance from the disk armature for generating an eddy current loop in the disk armature.

In one embodiment, the system may include a central opening in the obverse surface, and a detector for receiving the electromagnetic waves reflected from the secondary mirror through the central opening of the primary mirror. In general, the primary mirror may be configured in a catadioptric telescopic system.

In one embodiment, the system may include a continuous obverse surface, and a detector for receiving the electromagnetic waves reflected from the secondary mirror. The electromagnetic waves are perpendicularly folded by the secondary mirror through an opening in the side of the telescopic system when the primary mirror is configured in a catoptric telescope.

A Shack-Hartmann filter for filtering the electromagnetic waves may also be included, where the filter converts the electromagnetic waves into a light dot pattern. A processor computes wavefront errors based on the light dot pattern produced by the filter. In one embodiment, the processor computes a pixel location and a pixel intensity of each light dot in the pattern image and compares the location and intensity to a predetermined location and a predetermined intensity for determining the wavefront errors.

The system may include a concave mirror base positioned along the reverse surface of the primary mirror for housing the plurality of actuators. The concave mirror base supports the primary mirror. The magnetic force applied to the reverse surface of the mirror has a magnitude, direction, and duration in correlation with a desired wavefront modification. In general, the magnitude, direction and duration of the magnetic force contours the mirror to perform low frequency wavefront correction and high frequency adaptive wavefront control.

The mirror in the system may include an aerogel core, an obverse sapphire layer and a reverse sapphire layer. In general, the aerogel core is bonded between the obverse sapphire layer and the reverse sapphire layer, and the obverse sapphire layer is coated with an optical layer for reflecting electromagnetic waves. In one embodiment, the aerogel core is comprised of a plurality of hexagonal structures having hollow centers arranged in a honeycomb.

It is understood that the foregoing general description and the following detailed description are exemplary, but are not restrictive, of the invention.

DETAILED DESCRIPTION OF THE INVENTION

As will be described, the present invention provides an optical system (e.g. a telescope) having a low mass flexible mirror in which the surface contour is modified by eddy current actuators. Modulation of the actuators modify wavefronts thereby correcting wavefront errors in received electromagnetic (e.g. light) waves (on the scale of fractions of a wavelength). Using the present invention, optical wavefront errors caused by factors such as fabrication errors, alignment errors, atmospheric conditions as well as unwanted deformations due to gravitational and inertial forces may be corrected in real-time. Such wavefront corrections provide an adaptable system which increases energy convergence of the received light waves, thereby improving image quality. The present invention may also be used to alter the spatial phase profile of a coherent light source (e.g. laser beam) reflected from the mirror's surface. Altering the shape of a laser beam may be useful in certain laser milling applications to improve kerf quality.

Figure 1A:
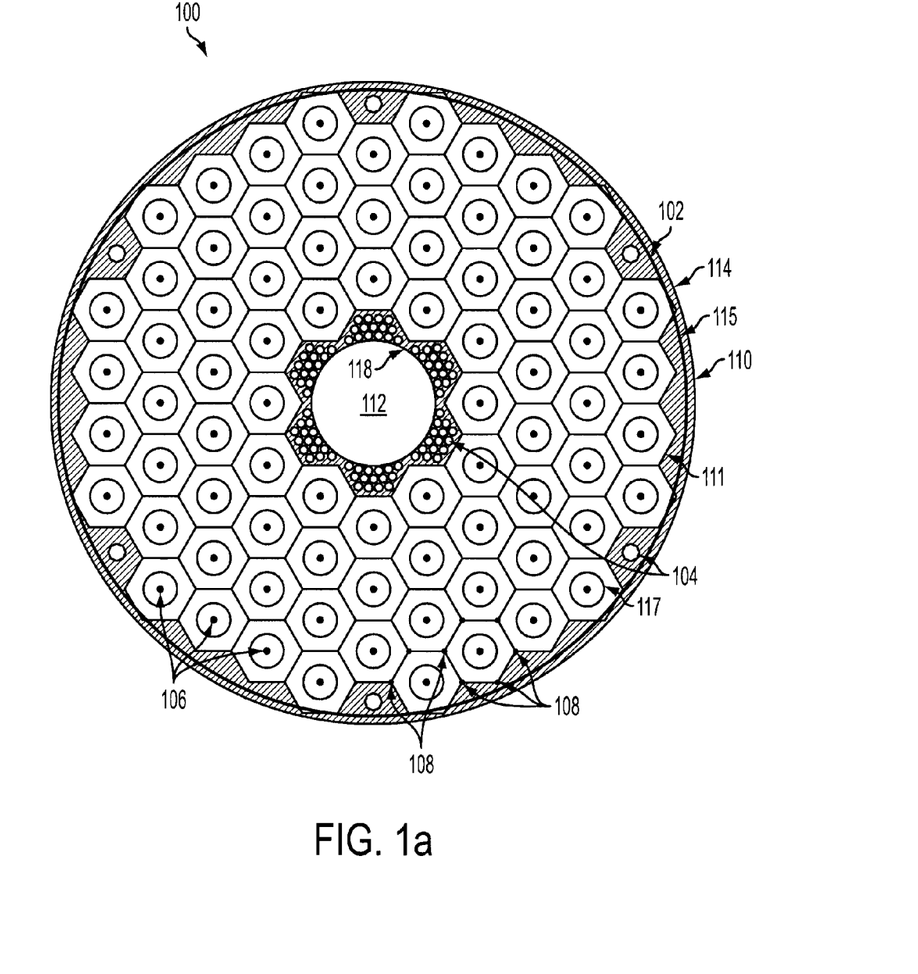
FIG. 1a is a top view of a mirror base including a central opening for supporting a flexible mirror (transparent for display purposes) with a central opening, where the mirror base and flexible mirror have different diameters, according to an embodiment of the present invention.

In one embodiment, FIG. 1a shows a top view of optical system 100 looking through flexible mirror 102 (transparent for display purposes) to a mirror base 110. Mirror 102 is a low mass flexible mirror resting on a plurality of hexagonal supports 111 arranged in a honeycomb that make up mirror base 110 (which may be manufactured from variety of rigid light weight low expansion materials such as silicon carbide and ultra low expansion glass). In this embodiment, hexagonal supports 111 are arranged as a honeycomb, each housing a respective eddy current actuator 106 (See FIG. 5 for details). Mirror base 110 also supports linear voice coil motors 104 in which the armatures of the motors are physically attached to a reverse surface of mirror 102. In this embodiment, both mirror base 110 and flexible mirror 102 may have roughly the same inner perimeter 118 (producing central opening 112). Also, the outer perimeter 114 of mirror base 110, and the outer perimeter 115 of mirror 102 may be different as shown in FIG. 1a, or may be the same (not shown).

Eddy current actuators 106 which are disposed in circular center cavity 117 of each hexagonal support 111, magnetically interact with metalized disk armatures 116 mounted on a reverse surface (non-reflecting side) of mirror 102. Mounted around the outer perimeter and inner perimeter of mirror base 110 are low mass linear voice coil motors 104 which are physically attached to the reverse side of mirror 102 (See FIG. 4 for details). Linear voice coil motors 104 may be arranged in clusters around the inner perimeter 118 or mounted separately around the outer perimeter 114 to attach mirror 102 to mirror base 110. In another embodiment, a three point kinematic mount may be arranged on mirror base 110 and physically attached to the reverse side of mirror 102. In general, the three point kinematic mount (not shown) may be used in place of, or in conjunction with the linear voice coil motors to hold mirror 102 and base 110 together.

Figure 4:
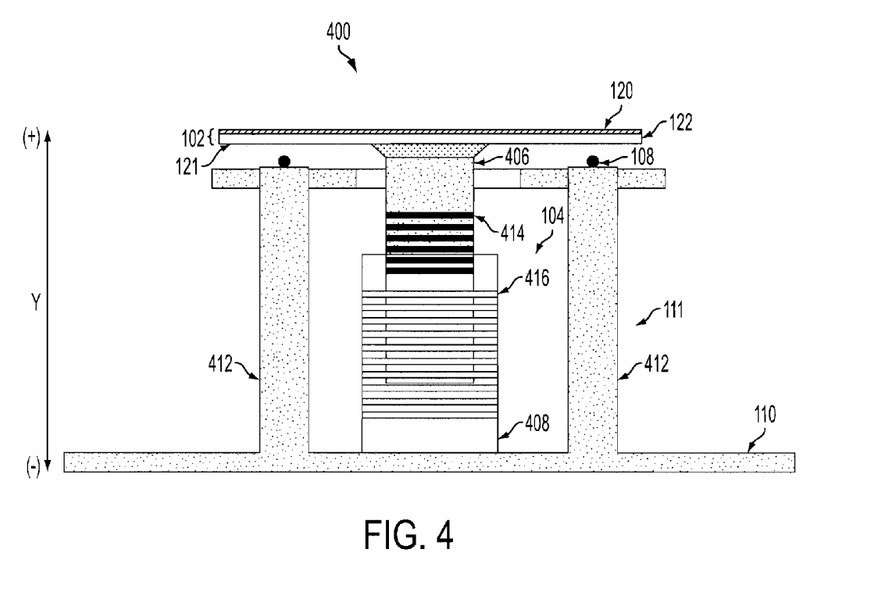
FIG. 4 is a cross-sectional view of a linear voice coil motor mounted to the mirror base in FIGS. 1a and 1b, and mounted to the reverse surface of the flexible mirror in FIG. 1c, according to an embodiment of the present invention.
Figure 5:
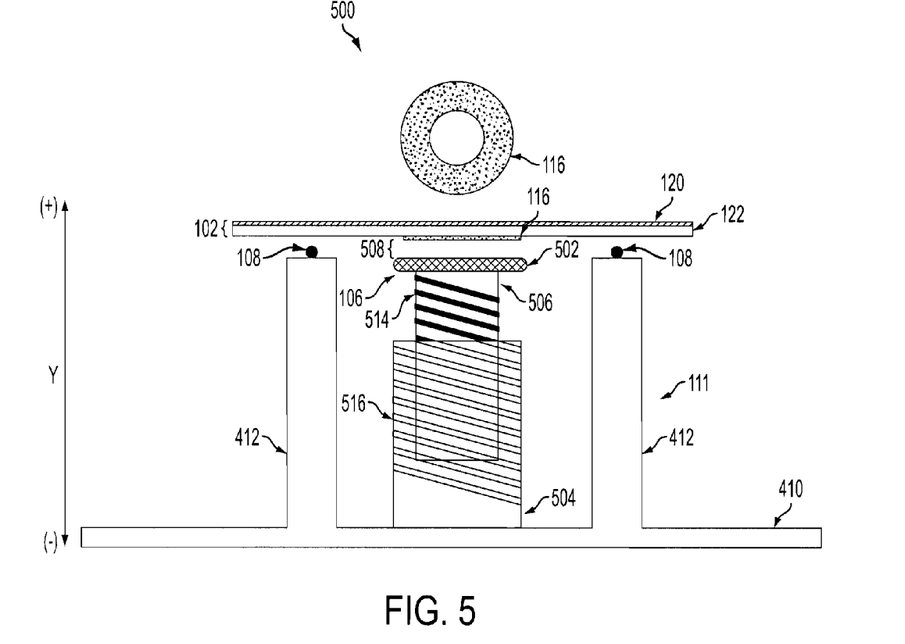
FIG. 5 is a cross-sectional view of an eddy current actuator housed in one of the hexagonal structures in FIGS. 1a and 2b, according to an embodiment of the present invention.

Soft stops 108 may also be mounted at the vertex of each hexagonal support 111 between the top of the hexagonal support and the reverse surface of the mirror (See FIGS. 4 and 5 for details). In general, soft stops 108 prevent mirror 102 from being damaged as a result of contact with mirror base 110. It should be noted that the size and arrangement of hexagonal supports 111 may be varied based on certain applications. Mirror base 110 may also include shapes other than hexagonal (e.g. circles, squares, triangles, etc. . . . ) to house the eddy current actuators. Furthermore, the number and the arrangement of both the linear voice coil motors and eddy current actuators may vary based on certain applications. For example, mirror base 110 could be arranged with many smaller hexagonal structures to create a uniform configuration to correct low frequency wavefront errors.

Figure 1B:
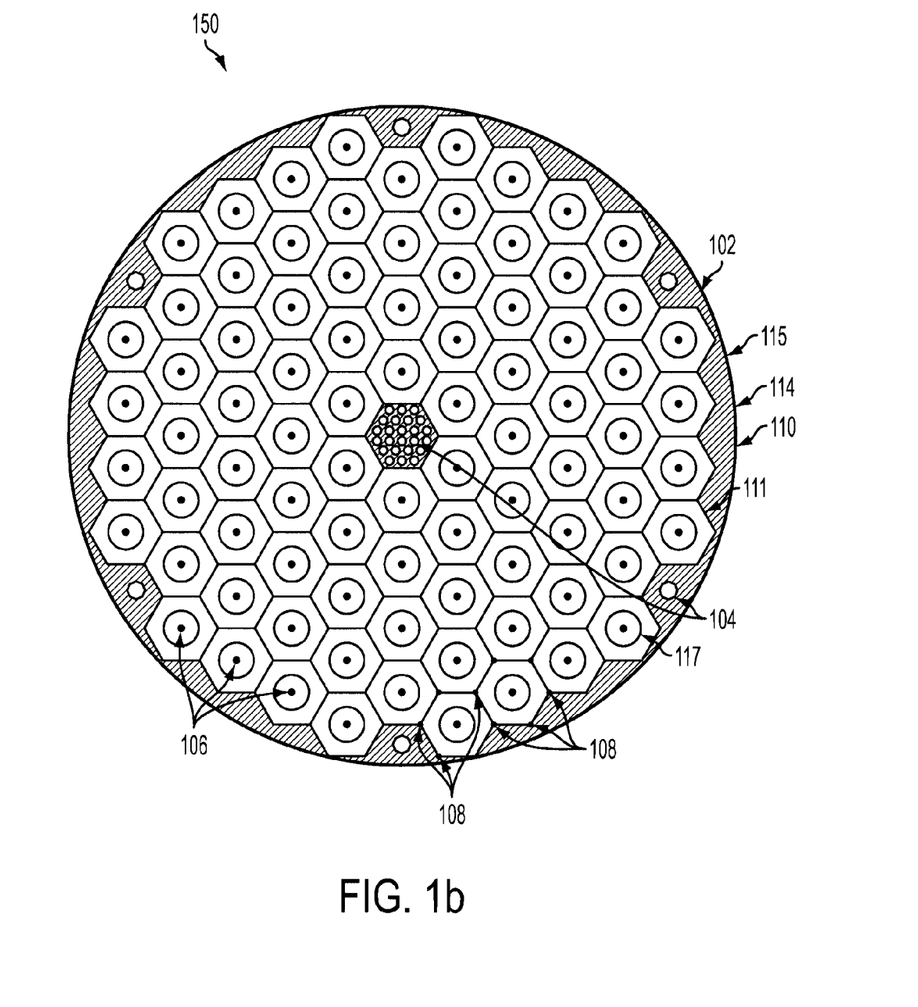
FIG. 1b is a top view of a continuous mirror base for supporting a continuous flexible mirror (transparent for display purposes), where the mirror base and flexible mirror have the same diameter, according to an embodiment of the present invention.

Optical system 100 in FIG. 1a, having central opening 112, may be a primary mirror in a catadioptric telescope (e.g. Schmidt-Cassegrain). In catoptric telescopes (e.g. Newtonian), however, a central opening may not be needed. FIG. 1b shows an optical system 150 which is similar to optical system 100 with the exclusion of central opening 112. Specifically, mirror base 110 and mirror 102 (transparent for display purposes) in FIG. 1b are continuous (do not have a central opening). Central opening 112 is replaced in FIG. 1b with additional hexagonal structures 111 (housing eddy current actuators) and a central cluster of linear voice coil motors 104. Mirror base 110 and mirror 102 may also have roughly the same outer perimeters 114 and 115 (although this is not necessary). As in FIG. 1*a*, a three point kinematic mount (not shown) may also be included in system 150.

In certain applications (e.g. reflecting telescopic applications), mirror base 110 may have a concave shape (parabolic) with respect to incoming light waves. The degree of curvature of the parabolic mirror base may be dictated by design needs for a specific telescope and application. By curving mirror base 110, mirror 102 (which rests on base 110) is also held in a nominal parabolic position for reflecting concentrated light waves to a destination.

Figure 1C:
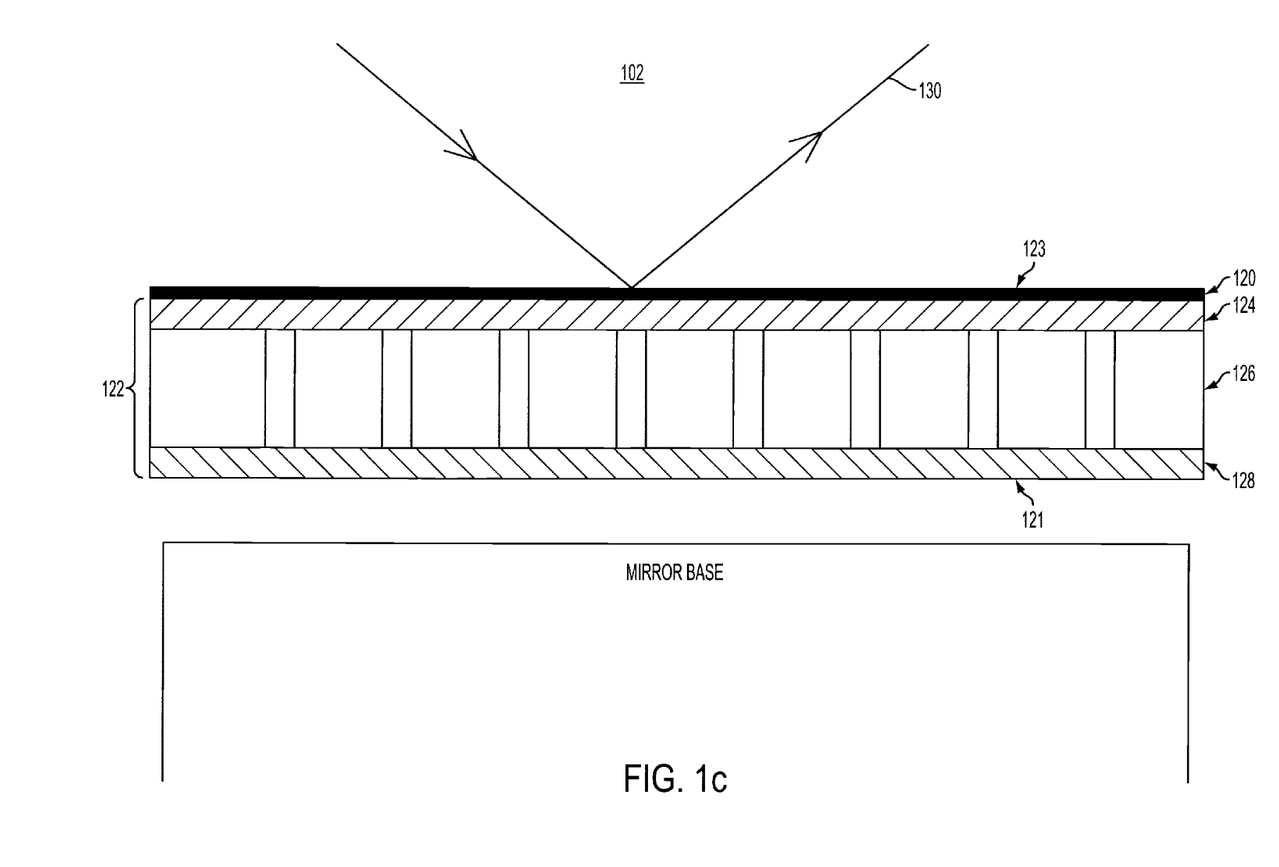
FIG. 1c is a cross-sectional view showing the layers of a flexible mirror supported by the mirror base in FIGS. 1a and 1b, according to an embodiment of the present invention.

Shown in FIG. 1*c* (cross sectional view) is an embodiment of mirror 102. In general, mirror 102 includes a light weight flexible (flexible on the order of the wavelength of incident radiation) aerogel core 126 sandwiched between a sapphire obverse layer 124 (layer facing incoming light waves), and a sapphire reverse layer 128 (layer facing mirror base 110). The aerogel core as shown in FIG. 1*c* may be a solid structure, a honeycomb structure 126 (similar to the mirror base) or any other structure sufficient to provide support and flexibility to a given mirror design. Low density aerogel core 126 provides stability as well as reduces the mass of mirror 102 (due to the rigid and sparsely filled structures). The aerogel core may be a monolithic aerogel. Moreover, the aerogel core provides a thermal barrier with a low coefficient of thermal expansion. Sapphire layers 124 and 128 provide structural support for the aerogel core as well as a substrate for optical coating 120.

During manufacturing, obverse layer 124 is coated with a reflective layer 120 in the electromagnetic radiation band of interest, while reverse layer 128 provides stress relief to the curved structure during the bonding process. In general, reverse surface 121 provides a surface for adhering metalized eddy current disk armatures 116 for interacting with field coils of the eddy current actuators (See FIG. 5 for details). Also, optical layer 120 provides an obverse surface 123 for reflecting incoming electromagnetic waves 130.

Figure 2A:
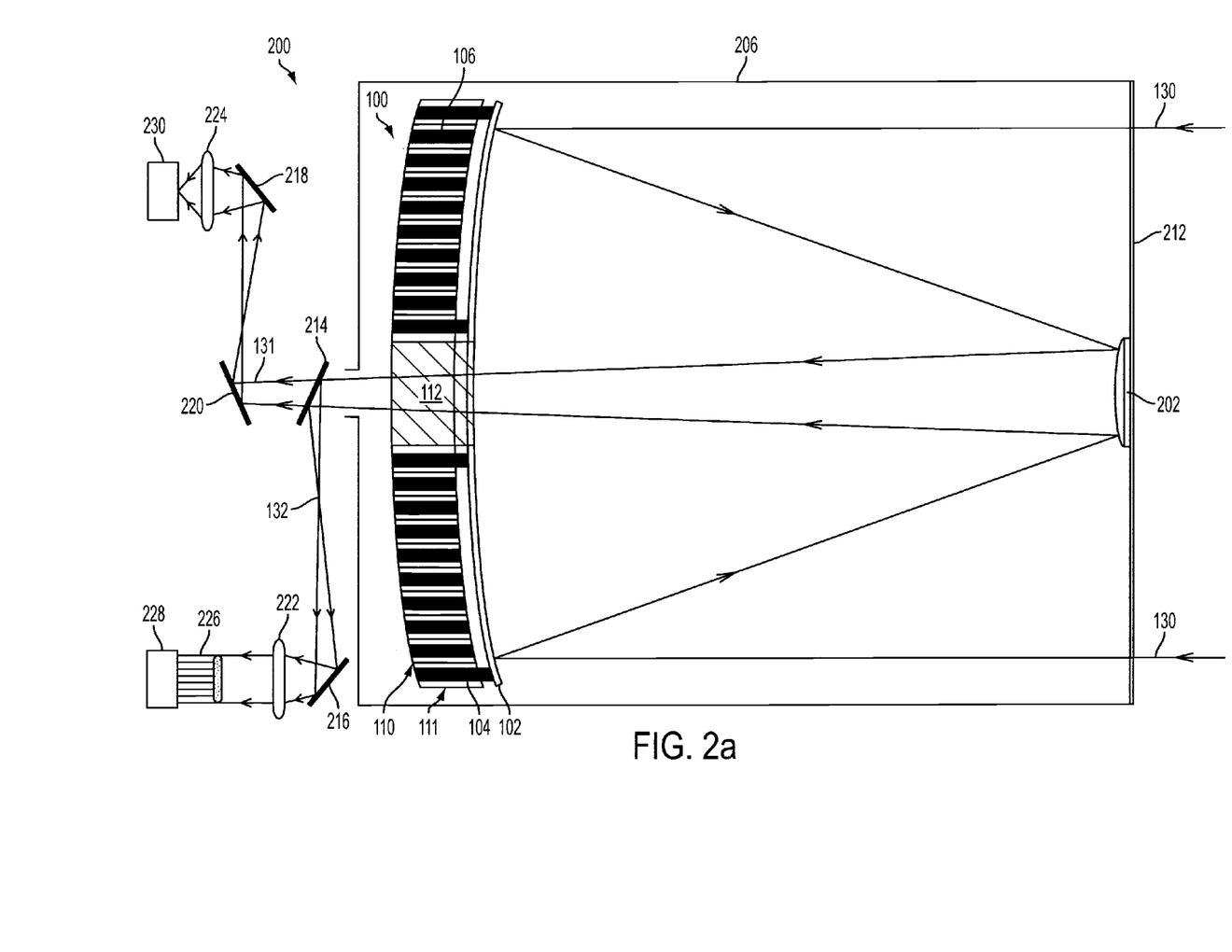
FIG. 2a is a side view of a Schmidt-Cassegrain telescope including the flexible mirror mounted on the mirror base in FIG. 1a, according to an embodiment of the present invention.

FIG. 2*a* shows a cross-sectional view of a Schmidt-Cassegrain (catadioptric) telescope 200 utilizing optical system 100 (cross sectional view) as a primary mirror. As light waves 130 enter telescope tube 206 through corrective lens 212, they are reflected by obverse surface 123 of mirror 102 towards convex secondary mirror 202. The light waves are then reflected through central opening 112 of mirror 102 and split into two beams (131 and 132 respectively) by beam splitter 214.

Beam 131 is folded by mirrors 220 and 218 respectively, and refracted by lens 224. Refracted beam 131 is then received by image sensor 230 where it may be viewed by a user. Beam 132 is folded by mirror 216, collimated by collimating lens 222, filtered by light filter 226 and received by sensor 228 (e.g. imager) where the signal is detected for processing.

Figure 2B:
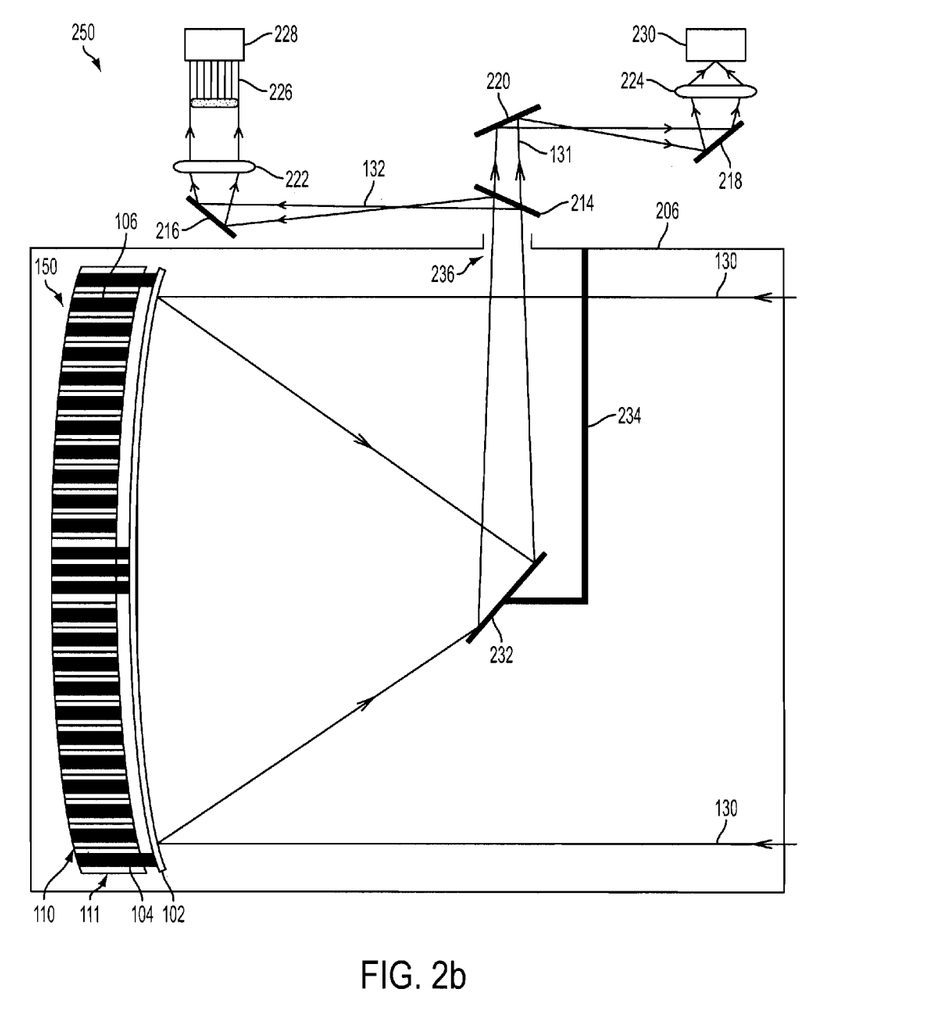
FIG. 2b is a side view of a Newtonian telescope including the flexible mirror mounted on the mirror base in FIG. 1b, according to an embodiment of the present invention.

FIG. 2*b* shows a cross-sectional view of a Newtonian (catoptric) telescope 250 utilizing optical system 150 (cross sectional view) as a continuous primary mirror (without a central opening 112). As light waves 130 enter telescope tube 206, they are reflected by obverse surface 123 of mirror 102 towards fold mirror 232 which is suspended from tube 206 by support 234. The light waves are then reflected through a side opening 236 in tube 206 and split into two beams (131 and 132 respectively) by beam splitter 214 (similar to the Schmidt-Cassegrain telescope in FIG. 2*a*).

Similar to system 100, beam 131 is folded by mirrors 220 and 218 respectively, and refracted by lens 224. Refracted beam 131 is then received by image sensor 230 where it may be viewed by a user. Beam 132 is folded by mirror 216, collimated by collimating lens 222, filtered by light filter 226 and received by sensor 228 where the signal is detected for processing.

Figure 3:
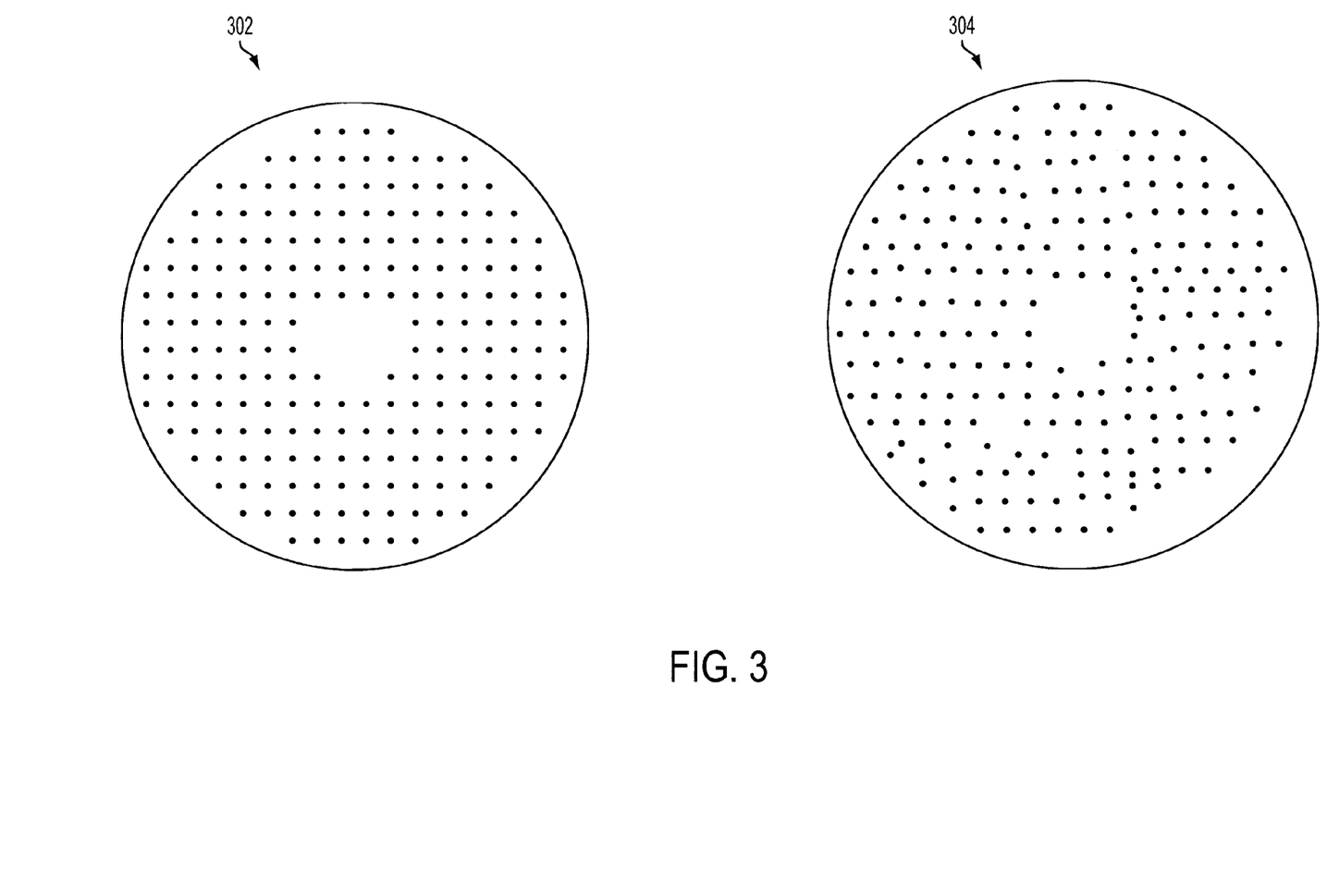
FIG. 3 shows two light patterns produced by a Shack-Hartmann array, according to an embodiment of the present invention.

Filter 226 in systems 100 and 150 may be any type of light filter or grating which produces a light pattern which may be analyzed. For example, filter 226 may produce a set geometric pattern of light points (e.g. Shack-Hartmann Lens-let array). Shown in FIG. 3 are two examples of a Shack-Hartmann light pattern produced by filter 226. Collimated light from lens 222 enters filter 226 and is filtered into a Shack-Hartmann pattern of light intensity dots. The light dots output from the filter are received by sensor 228 where they are analyzed by a processor (not shown). In general, each dot may illuminate N number of pixels in sensor 228, where the ideal size (number of pixels per dot), location (which pixels) and brightness (pixel intensity) of each dot is known to the processor. During analysis, the size, location and intensity of each light dot in a given pattern is compared to the ideal size, ideal location and ideal intensity values known to the processor.

Pattern 302 in FIG. 3 shows an ideal pattern of light intensity dots produced by the filter when the light waves received by telescope 200 or 250 have insignificant wavefront errors. Pattern 304 in FIG. 3, however, shows a non-ideal pattern where the sizes, shapes, locations and intensities of the light dots have been altered due to wavefront errors. This non-ideal pattern may be a result of wavefront errors produced when mirror 102 is deformed due to gravitational or inertial forces.

Analysis of the non-ideal dots may include computing a centroid of each ideal dot and non-ideal dot. A vector may be computed from the center of the non-ideal dot to the center of the ideal dot. This vector describes the overall movement of each dot (how far and at what direction the dot has traveled from the ideal location). Based on this information, as well as dot size and intensity information, the processor (not shown) modulates the linear voice coil motors and eddy current actuators to flex the mirror at various points along its surface. By modifying the surface contour of mirror 102, wavefront errors may be reduced or eliminated.

An interferometer (not shown) may also be used to analyze the wavefronts. The interferometer may convert the electromagnetic waves into a light-dark fringe pattern. The processor may then compute the wavefront errors based on the light-dark fringe pattern, and modulate the actuators accordingly.

In general, control of the motors and actuators may be performed in a variety of ways, intermittently or continuously to maintain a desired contour of the mirror (from initial calibration corrections to counteracting deformations caused by gravitational load/unload and inertial forces). A steady state condition may be desired to calibrate or correct for known errors. In general, low frequency modulation may be used for inertial wavefront correction while high frequency modulation may be used for agile adaptive wavefront control. The controller modulates the motors and actuators until the ideal dot pattern is approached or achieved (i.e. the mirror has obtained the desired surface contour to reduce or eliminate the wavefront errors and or produce the desired impulse response).

FIG. 4 shows a cross sectional view of mirror base 110 including linear voice coil motor 104 housed in the center of hexagonal support walls 412. Stator 408 of motor 104 is physically attached to mirror base 110 in the center of hexagonal support 111. Armature 406 is physically attached to reverse surface 121 of mirror 102.

During operation, an electromagnetic field is induced in the coils 416 of stator 408 which magnetically interacts with coils 414 of armature 406. This magnetic force either pushes or pulls armature 406 up or down respectively in the transverse (+/−) Y direction. When armature 406 is pulled down in the (−) Y direction, mirror 102 flexes towards mirror base 110. If mirror 102 is pulled down too far, soft stops 108 prevent the reverse surface of the mirror from contacting the top of walls 412. In contrast, when armature 406 is pushed up in the (+) Y direction, mirror 102 flexes away from mirror base 110.

Referring to FIG. 5 there is shown an embodiment of an eddy current actuator 106 including field coil 502 mounted on the top of a screw drive motor which includes a movable part 506 and a stationary part 504. Also included in system 500 is a light weight metalized disk armature 116 adhered to reverse surface 121 of mirror 102. Field coil 502 and disk 116 are spaced away from each other at a nominal distance 508 which allows eddy currents to flow. In general, the eddy currents produce a repulsive magnetic force pushing in the (+) Y direction on reverse surface 121 of mirror 102. The screw drive motor 504 and 506 (using threads 514 and 516) may be used to initially position field coil 502 to within working distance 508 of disk armature 116 prior to modulating the actuator. This nominal air gap 508 ensures that eddy currents flow in armature 116. Also, shown in planar view (above the mirror) disk 116 is a doughnut shape including an outer and inner perimeter.

During operation, an electromagnetic field is induced in field coil 502 which pushes armature 116 up in the (+) Y direction with varying amounts of force depending on the correction needed. Eddy currents are induced in armature 116 which induce a magnetic field. The magnetic field in disk 116 interacts with a magnetic field in coil 502 through magnetic repulsion (note that the nominal gap 508 is maintained between field coil 502 and armature disk 116 by the voice coil motors).

In general, the pull of the voice coil motors in the (−) Y direction and the push of the eddy current actuators in the (+) Y direction are sufficient to hold the mirrors center of mass static (floating in space) with respect to the mirror base in the presence of gravitational and inertial forces. The amplitude of the individual eddy current actuator modulations is designed to correct the local wave front while the average push is sufficient to hold mirror 102 fixed in space with respect to mirror base 110.

A benefit of eddy current actuators is that they do not add significantly to the mass of mirror 102 (field coils 502 do not physically contact the eddy current disk armatures 116 on the reverse surface of the mirror). Moreover, the eddy current actuators do not add stress points to the mirror that typically result from actuators that are physically attached to the mirror.

As previously described, wavefront errors may be caused by many conditions such as gravitational and inertial forces. In one example, telescope 200 may be included in a space vehicle. When the space vehicle accelerates in any given direction, inertia may distort the contour of the mirror. To compensate for these inertial forces, the voice coil motors and eddy current actuators are energized (modulated) to push/pull (hold) the mirror. The amplitude, direction and duration of the forces exerted by the motors and actuators are controlled by the processor to correct the wavefront errors. In one example, the amplitude, direction and duration of the forces exerted by the motors and actuators may be equivalent (correlated) to the mirror's gravitational or inertial forces.

When system 100 is included in a space vehicle as described in the example above, safely controlling the movement and vibration of mirror 102 during space launch may also be beneficial. During space launch, mirror 102 may be held against soft stops 108 in response to a pulling force exerted by motors 104. In another example, soft stops may be adhesively connected to both the vertices of the hexagonal supports 111 and reverse surface 121 of mirror 102. The adhesive may then be melted away after launch is complete, thereby freeing mirror 102.

In another example, system 100 may be included in a terrestrial observatory. Due to atmospheric conditions and gravitational forces acting on the mirror, wavefronts received from celestial objects may be distorted. Similar to the above described example, the motors and actuators are modulated to maintain a desired impulse response by changing the contour of mirror 102, thereby correcting wavefront errors and providing the desired image quality at the plane of focus.

The reciprocities in systems 100 and 150 described above also allow the systems to transmit electromagnetic energy. Systems 100 and 150 may be utilized in applications that require beam shape control of an emitted laser beam. Modifying the beam profile of a laser is a technique used in the laser milling and machining industry to improve kerf quality when laser cutting various materials.

Surface 120 of the flexible mirror 102 may be modified to control the projection of the second moment (beam diameter) of a coherent electromagnetic source (laser) in the far field. The mirror surface 120 is modified by the eddy current actuators to control the spatial phase profile of the beam, thus producing various beam shapes which may include but are not limited to Gaussian, rectangular and elliptical super-Gaussians.

Figure 6A:
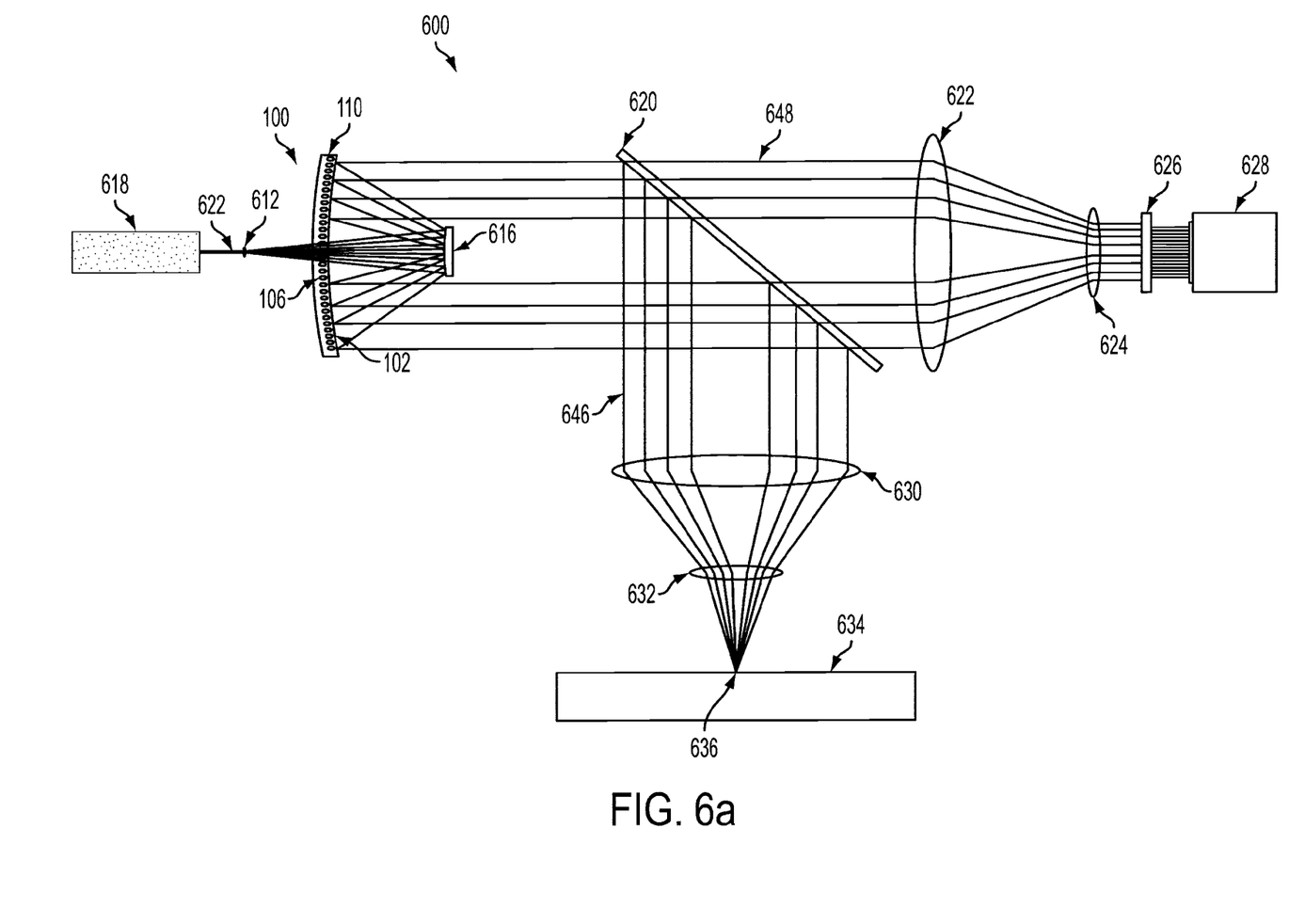
FIG. 6a shows a laser beam shaping system for modifying a profile of a laser beam with the flexible mirror system in FIG. 1a, according to an embodiment of the present invention.

FIG. 6a shows a laser beam shaping system 600 including optical system 100. A laser beam 622 is emitted from laser 618, expanded by lens 612 and reflected by secondary mirror 616 and primary mirror 102 towards beam splitter 620. Beam splitter 620 diverts most of the beams power (beam 646) towards lenses 630 and 632 where the beam is focused at a location 636 on workpiece 634 (i.e. the material to be cut). Some of the laser beams power (beam 648) passes through splitter 620, where it refracted and collimated by lenses 622 and 624 respectively. The beam is then filtered by Shack-Hartman array 626 and detected by sensor 628.

In general, the Shack-Hartman pattern detected by sensor 628 correlates to a specific beam shape. For example, a Gaussian beam shape produces a unique pattern different from a rectangular beam shape. The system therefore, modulates the eddy current actuators to modify mirror surface 120, thereby obtaining a desired pattern which correlates to a desired beam shape.

Figure 6B:
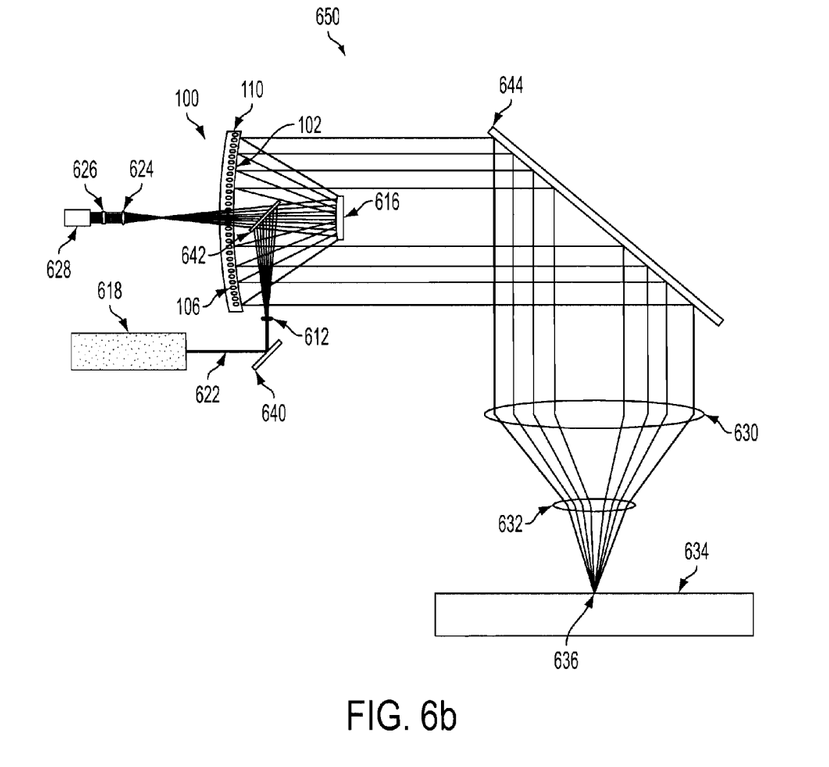
FIG. 6b shows another laser beam shaping system for modifying a profile of a laser beam with the flexible mirror system in FIG. 1a, according to an embodiment of the present invention.

System 650 in FIG. 6b shows another laser beam shaping system including a reflecting path. Laser beam 622 is emitted by laser 618, folded by mirror 640 and split by beam splitter 642. The laser beam is reflected by beam splitter 642 towards secondary mirror 616, primary mirror 102 and folding mirror 644. The beam is then passed through lenses 630 and 632, where it is focused at location 636 on workpiece 634.

In general, workpiece 634 has a reflectance which reflects some of the lasers power back through the system where it is filtered by 626 and detected by sensor 628 (i.e. the laser is reflected by the workpiece through lenses 632 and 630, reflected by mirrors 644, 102 and 616 and passed to the sensor 628 through beam splitter 642). This configuration allows the system to receive and analyze a reflected beam from the workpiece, thereby determining the laser beam shape at the focus point 636. Due to analyzing the beams reflection, a more intelligent control may be implemented to more accurately shape laser beam 622. This configuration also allows for efficient power transfer from laser 618 to workpiece 636 (i.e. only a fraction of the beams power transmits through the beam splitter 642 to reach the Shack-Hartman array 626). In this embodiment, mirror 640 may also be replaced with a steerable mirror to alter the position of the laser beam on the workpiece (i.e. steering the laser beam).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for modifying wavefronts of electromagnetic waves comprising:
    a flexible mirror having an obverse surface and a reverse surface, the obverse surface having a contour configured to reflect electromagnetic waves;
    a plurality of actuators positioned along the reverse surface for applying at least one transverse magnetic force to the flexible mirror to modify the contour of the obverse surface; and
    a mirror base positioned along the reverse surface,
    wherein the mirror base includes a plurality of structures for housing the plurality of actuators; and
        the plurality of actuators modify the contour of the obverse surface which, in turn, modifies wavefronts of the electromagnetic waves.

2. The system of claim 1, wherein
    the flexible mirror includes obverse and reverse layers, and low density core sandwiched between the obverse and reverse layers,
    wherein the obverse layer includes the obverse surface, and the reverse layer includes the reverse surface.

3. The system of claim 2 wherein
    the obverse and reverse layers are each comprised of sapphire, and the low density core is comprised of aerogel.

4. The system of claim 1 wherein
    the mirror base is comprised of silicon carbide.

5. The system of claim 1 wherein
    the plurality of actuators include at least one eddy current actuator having a field coil and a disk armature,
    the disk armature is attached to the reverse surface of the flexible mirror,
    a gap is formed between the disk armature and the field coil, and
    the transverse force is a magnetic force applied through the gap between the disk armature and the field coil.

6. The system of claim 1 wherein
    the plurality of actuators include at least one linear voice coil motor having an armature attached to the reverse surface of the mirror; and
    the transverse force is applied by the armature to the reverse surface of the mirror.

7. The system of claim 1 including
    a filter having an array of openings for receiving the electromagnetic waves reflected from the flexible mirror and forming a pattern,
    a sensor for detecting the pattern, and
    a processor for receiving the pattern from the sensor and determining wavefront errors in the electromagnetic waves, and providing a signal to at least one actuator to provide the at least one transverse force to the flexible mirror to modify the electromagnetic wavefront.

8. A telescopic system for correcting wavefront errors comprising:
    a primary flexible mirror having an obverse surface and a reverse surface, the obverse surface having a contour configured to reflect electromagnetic waves received by the telescopic system;
    a secondary mirror configured to receive the electromagnetic waves reflected from the primary mirror;
        a plurality of actuators positioned along the reverse surface for applying a transverse magnetic force to the flexible mirror to modify the contour of the obverse surface; and
    a mirror base positioned along the reverse surface,
    wherein the mirror base includes a plurality of structures for housing the plurality of actuators; and
        the plurality of actuators modify the contour of the obverse surface which, in turn, modifies the wavefront of the electromagnetic waves received by the telescopic system.

9. The telescopic system of claim 8 wherein
    the plurality of actuators includes at least one eddy current actuator having an field coil and a disk armature,
    the disk armature is attached to the reverse surface of the flexible mirror, and
    the field coil is positioned at a distance from the disk armature for generating an eddy current loop in the disk armature.

10. The telescopic system of claim 8, including
    a central opening in the obverse surface, and
    a detector receiving the electromagnetic waves reflected from the secondary mirror through the central opening of the primary mirror,
    wherein the primary mirror is configured in a catadioptric telescopic system.

11. The telescopic system of claim 8, including
    a continuous obverse surface, and
    a detector receiving the electromagnetic waves reflected from the secondary mirror,
    wherein the electromagnetic waves are perpendicularly folded by the secondary mirror through an opening in the side of the telescopic system, the primary mirror configured in a catoptric telescope.

12. The telescopic system of claim 8 including
    a Shack-Hartmann filter for filtering the electromagnetic waves, the filter converting the electromagnetic waves into a light dot pattern,
    a processor for computing wavefront errors based on the light dot pattern produced by the filter.

13. The telescopic system of claim 12 wherein
    the processor computes a pixel location and a pixel intensity of each light dot in the pattern image and compares the location and intensity to a predetermined location and a predetermined intensity for determining the wavefront errors.

14. The telescopic system of claim 8, including
    a concave mirror base positioned along the reverse surface of the primary mirror for housing the plurality of actuators, the concave mirror base supporting the primary mirror.

15. The telescopic system of claim 8, wherein
    the magnetic force applied to the reverse surface of the mirror has a magnitude, direction, and duration in correlation with a desired wavefront modification.

16. The telescopic system of claim 15, wherein
    the magnitude, direction and duration of the magnetic force contours the mirror to perform low frequency wavefront correction and high frequency adaptive wavefront control.

* * * * *